United States Patent
Kim et al.

(10) Patent No.: US 8,514,792 B2
(45) Date of Patent: Aug. 20, 2013

(54) MOBILE STATION, BASE STATION, AND METHOD FOR UPLINK SERVICE

(75) Inventors: Juhee Kim, Daejeon (KR); Kyung Soo Kim, Daejeon (KR)

(73) Assignees: Samsung Electronics Co., Ltd., Suwon-si (KR); Electronics and Telecommunications Research Inst., Daejeon (KR)

( * ) Notice: Subject to any disclaimer, the term of this patent is extended or adjusted under 35 U.S.C. 154(b) by 406 days.

(21) Appl. No.: 12/481,456

(22) Filed: Jun. 9, 2009

(65) Prior Publication Data

US 2009/0310553 A1   Dec. 17, 2009

(30) Foreign Application Priority Data

Jun. 13, 2008 (KR) .................. 10-2008-0055624
Mar. 31, 2009 (KR) .................. 10-2009-0027795

(51) Int. Cl.
*H04W 4/00* (2009.01)

(52) U.S. Cl.
USPC .......................................................... 370/329

(58) Field of Classification Search
None
See application file for complete search history.

(56) References Cited

U.S. PATENT DOCUMENTS

| 5,905,871 | A * | 5/1999 | Buskens et al. ............... 709/245 |
| 6,208,620 | B1 * | 3/2001 | Sen et al. ...................... 370/231 |
| 7,283,814 | B2 | 10/2007 | Klein et al. |
| 2001/0015956 | A1 * | 8/2001 | Ono ............................... 370/229 |
| 2006/0165029 | A1 * | 7/2006 | Melpignano et al. ......... 370/328 |
| 2007/0133416 | A1 | 6/2007 | Hyon et al. |
| 2007/0140165 | A1 * | 6/2007 | Kim et al. ...................... 370/329 |

FOREIGN PATENT DOCUMENTS

| JP | 2007-110680 A | 4/2007 |
| KR | 10-2005-0014705 A | 2/2005 |
| KR | 10-2006-0034539 A | 4/2006 |
| KR | 10-0668670 B1 | 1/2007 |
| KR | 10-2007-0063351 A | 6/2007 |
| KR | 10-2007-0092173 A | 9/2007 |

\* cited by examiner

*Primary Examiner* — Chi Pham
*Assistant Examiner* — Kouroush Mohebbi
(74) *Attorney, Agent, or Firm* — Jefferson IP Law, LLP

(57) ABSTRACT

The present invention relates to a mobile station, a base station, and a method for an uplink service that provides a high-speed data service between the base station and the mobile station in a wireless communication system. A method for providing an uplink service in a mobile station includes, after TCP data are received from a base station, measuring a partial round trip time which is a time until ACK which is a response to the received TCP data is inputted into an uplink transmission MAC buffer, transmitting information on the measured partial round trip time to the base station, receiving resource allocation information—unicast resource allocation information for transmitting the ACK to the base station in the mobile station—from the base station, and transmitting the ACK of the TCP data received from the base station on the basis of the resource allocation information to the base station.

10 Claims, 5 Drawing Sheets

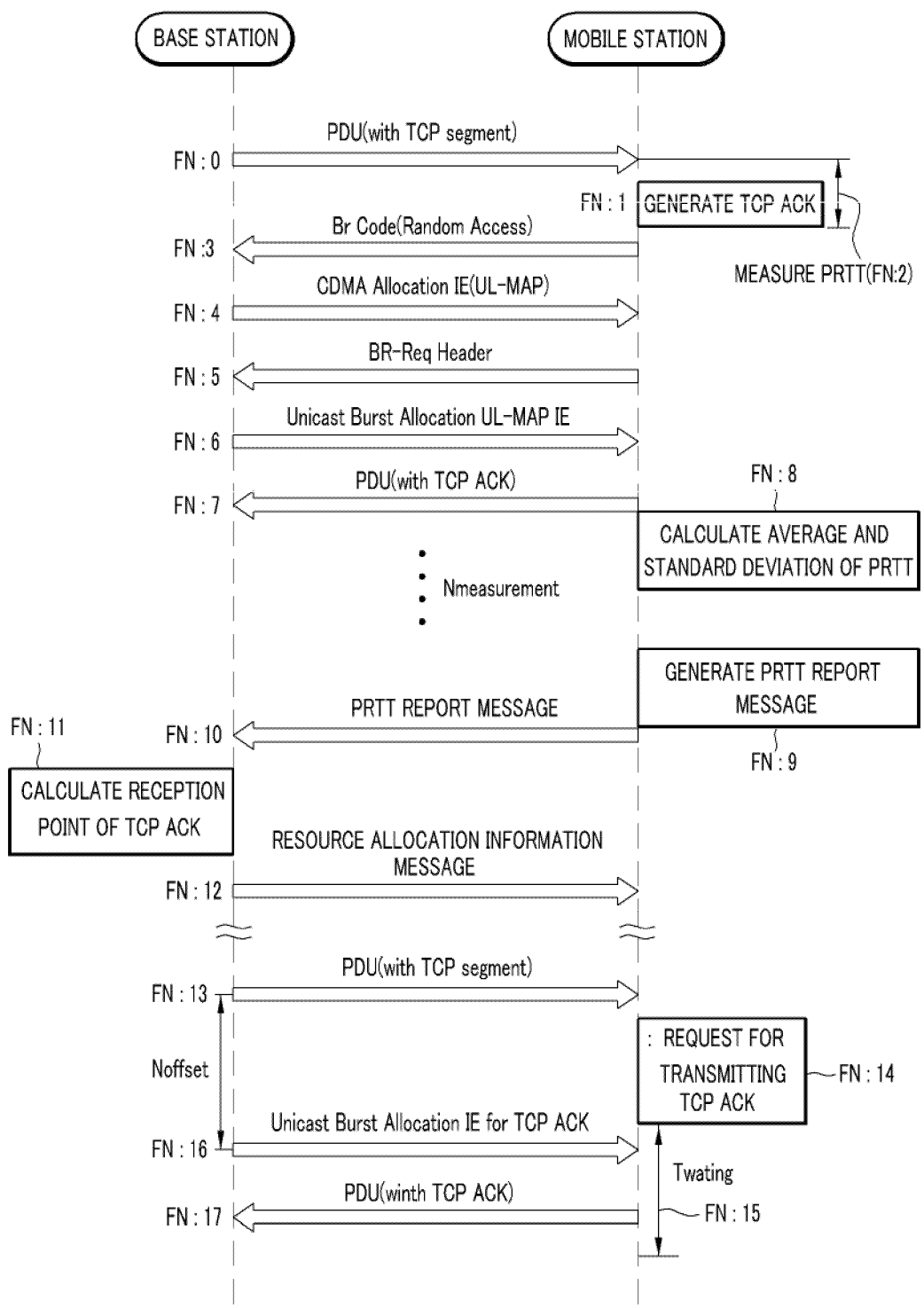

MOBILE STATION, BASE STATION, AND METHOD FOR UPLINK SERVICE

CROSS-REFERENCE TO RELATED APPLICATION

This application claims priority to and the benefit of Korean Patent Application Nos. 10-2008-0055624 and 10-2009-0027795 filed in the Korean Intellectual Property Office on Jun. 13, 2008 and Mar. 31, 2009, the entire contents of which are incorporated herein by reference.

BACKGROUND OF THE INVENTION (a) Field of the Invention

The present invention relates to a mobile station, a base station, and a method for an uplink service that provides a high-speed data service between the base station and the mobile station in a wireless communication system.

(b) Description of the Related Art

In a wireless communication system, when downlink TCP traffic occurs from a base station to a mobile station, the mobile station that receives a TCP packet transmits ACK of the received packet to the base station, such that transmission of one TCP datum is completed.

More specifically, the mobile station that receives the TCP packet from the base station generates TCP ACK of the received TCP packet and tries wireless section random access in order to transmit the generated TCP ACK to the base station. Thereafter, when the mobile station succeeds to access the base station, the mobile station is allocated with a resource for transmission of the TCP ACK from the base station and transmits the TCP ACK to the base station by using the allocated resource.

At this time, in wireless section random access in which the mobile station tries in order to transmit the TCP ACK to the base station, since multiple users competitively access the base station, code collision probability increases depending on the number of users and traffic load. Further, in the case of failing in initial wireless access, the mobile station repeatedly tries the access, such that a network speed remarkably decreases.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a mobile station, a base station, and a method for an uplink service having advantages of providing a high-speed data service between the base station and the mobile station in a wireless communication system.

An exemplary embodiment of the present invention provides a method for an uplink service.

The method for providing an uplink service in a mobile station includes: (a) after TCP data are received from a base station, measuring a partial round trip time which is a time until ACK which is a response to the received TCP data is inputted into an uplink transmission MAC buffer; (b) transmitting information on the measured partial round trip time to the base station; (c) receiving resource allocation information—unicast resource allocation information for transmitting the ACK to the base station in the mobile station—from the base station; and (d) transmitting the ACK of the TCP data received from the base station on the basis of the resource allocation information to the base station.

Another embodiment of the present invention provides a method for an uplink service.

The method for providing an uplink service to a mobile station in a base station includes: (a) receiving information on a partial round trip time—a time until ACK which is a response to TCP data is inputted into an uplink transmission MAC buffer after the mobile station receives the TCP data from the base station—from the mobile station; (b) calculating a reception point of ACK of the TCP data to be transmitted in the future on the basis of information on the partial round trip time and transmitting resource allocation information—unicast resource allocation information for transmitting the ACK to the base station in the mobile station—to the mobile station; and (c) allocating a unicast uplink resource to the mobile station at the reception point of the ACK after transmitting the TCP data to the mobile station.

According to the present invention, it is possible to provide a mobile station, a base station, and a method for an uplink service that provide a high-speed data service between the base station and the mobile station in a wireless communication system.

BRIEF DESCRIPTION OF THE DRAWINGS

FIG. 3 is a flowchart of a method for an uplink service according to an exemplary embodiment of the present invention.

DETAILED DESCRIPTION OF THE EMBODIMENTS

Figure 1:
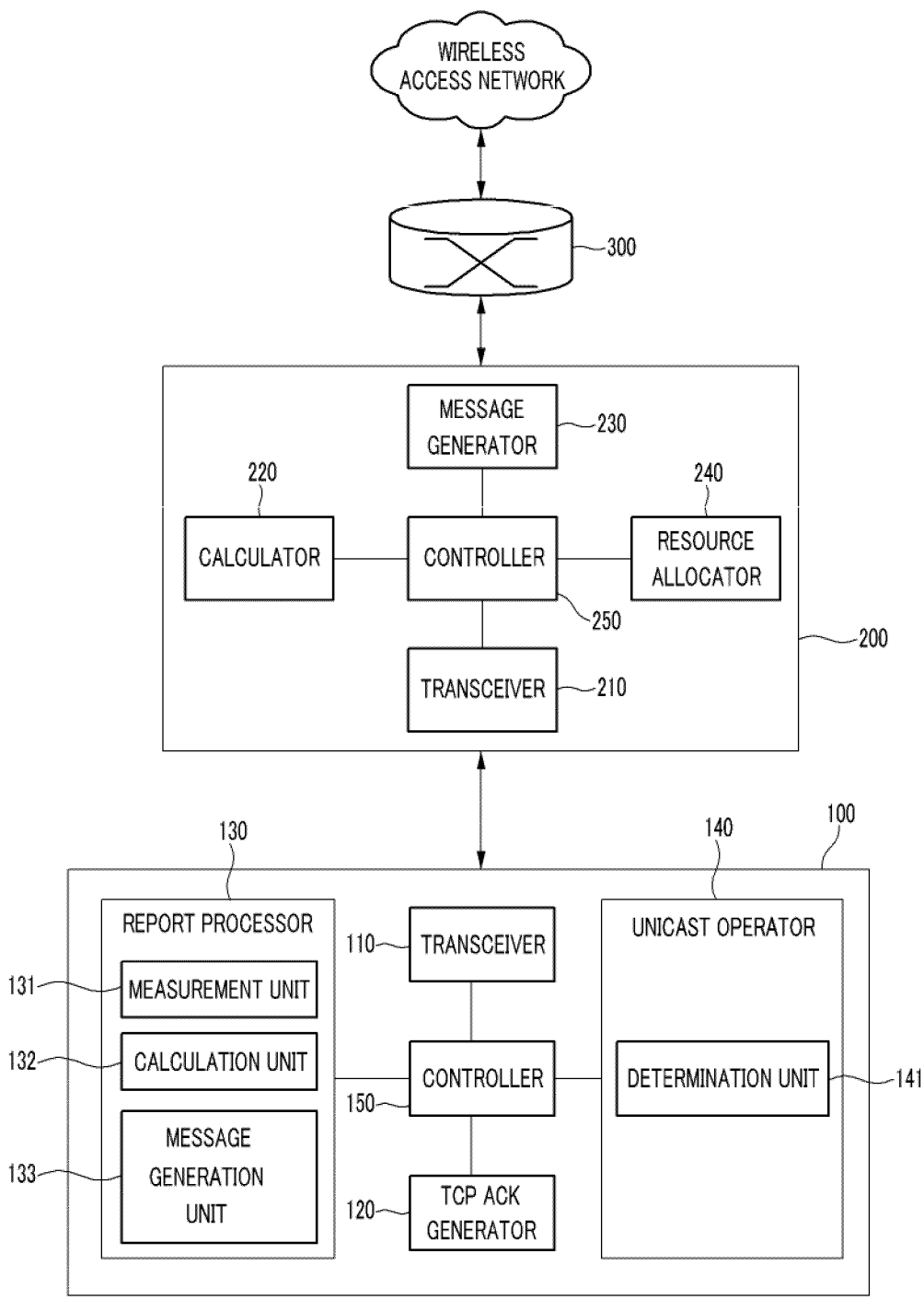
FIG. 1 is a block diagram of a wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In addition, throughout the specification, unless explicitly described to the contrary, the word "comprise" and variations such as "comprises" or "comprising" will be understood to imply the inclusion of stated elements but not the exclusion of any other elements.

In addition, the terms "-er", "-or", and "module" described in the specification mean units for processing at least one function and operation and can be implemented by hardware components or software components and combinations thereof.

Throughout the specification, a round trip time (RTT) is a time until TCP ACK which is a response to a corresponding TCP is received from a mobile station after a base station transmits a TCP packet to the mobile station.

Further, a partial round trip time (PRTT) is a time until the received TCP packet is transmitted to a TCP hierarchy of the mobile station and TCP ACK which is a response to the received TCP is inputted into an uplink transmission MAC buffer from a point when the mobile station receives the TCP packet from the base station.

Hereinafter, a mobile station, a base station, and a method for an uplink service that provide a high-speed data service between the base station and the mobile station in a wireless communication system according to an exemplary embodiment of the present invention will be described in detail with reference to the accompanying drawings.

A system and a method for an uplink service according to an exemplary embodiment transmit and receive data by the frame unit in order to support high-speed transmission of packet data in a wireless section and operate based on OFDM/FDMA/TDD wireless transmission schemes.

FIG. 1 is a block diagram of a wireless communication system according to an exemplary embodiment of the present invention.

Referring to FIG. 1, the wireless communication system according to an exemplary embodiment of the present invention includes a mobile station 100, a base station 200, and an access router 300. The components of FIG. 1 will be described below.

The mobile station (MS) 100 includes a transceiver 110, a TCP ACK generator 120, a report processor 130, a unicast operator 140, and a controller 150. The mobile station 100 transmits TCP ACK to the base station 200 on the basis of information included in a "resource allocation information message" received from the base station 200. The components of the mobile station 100 will be described below.

The transceiver 110 transmits a partial round trip time (PRTT) report message generated in the report processor 130 to the base station 200 and receives the "resource allocation information message" received from the base station 200.

The TCP ACK generator 120 generates TCP ACK which is a response to a TCP packet received from the base station 200.

The report processor 130 includes a measurement unit 131, a calculation unit 132, and a message generation unit 133. The report generator 130 transmits the "PRTT report message" including an average and a standard deviation of a measured partial round trip time (PRTT) to the base station 200 through the transceiver 110. The components of the report processor 130 will be described below.

The measurement unit 131 measures the partial round trip time.

FIG. 2 is a diagram illustrating an example of measurement of a partial round trip time (PRTT) according to an exemplary embodiment of the present invention. The mobile station 100 measures the partial round trip time (PRTT) by analyzing a serial number of a TCP segment received from the base station 200 and an ACK number requested to be transmitted for a transmission MAC buffer.

However, since ACK is delayed by time-out of a delayed acknowledgment scheme TCP which responds to several data segments in single ACK, the partial round trip time (PRTT) that consumes 200 msec or more may be excluded from a measurement sample.

Figure 2A:
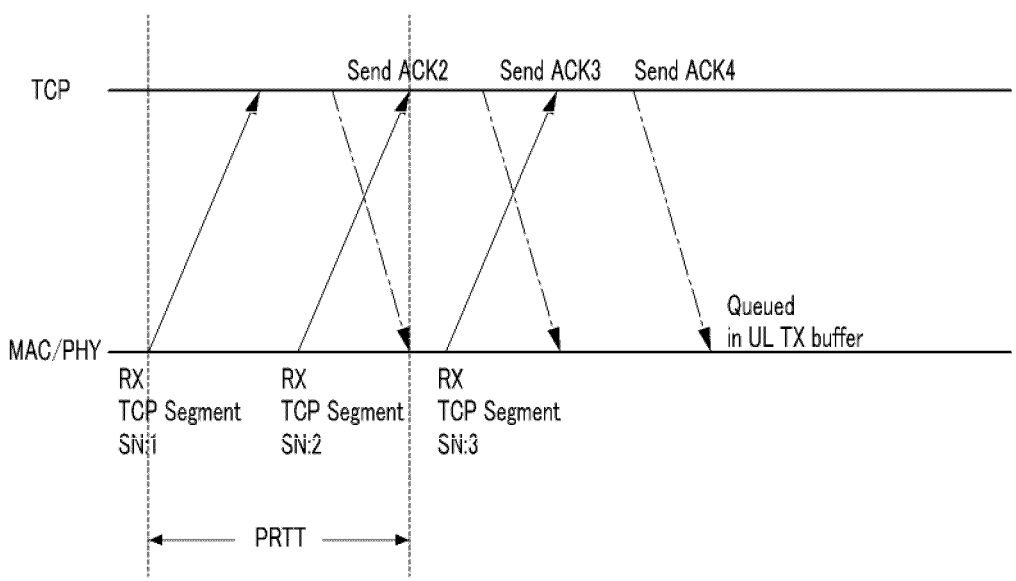
FIG. 2 is a diagram illustrating an example of measurement of a partial round trip time (PRTT) according to an exemplary embodiment of the present invention.
Figure 2B:
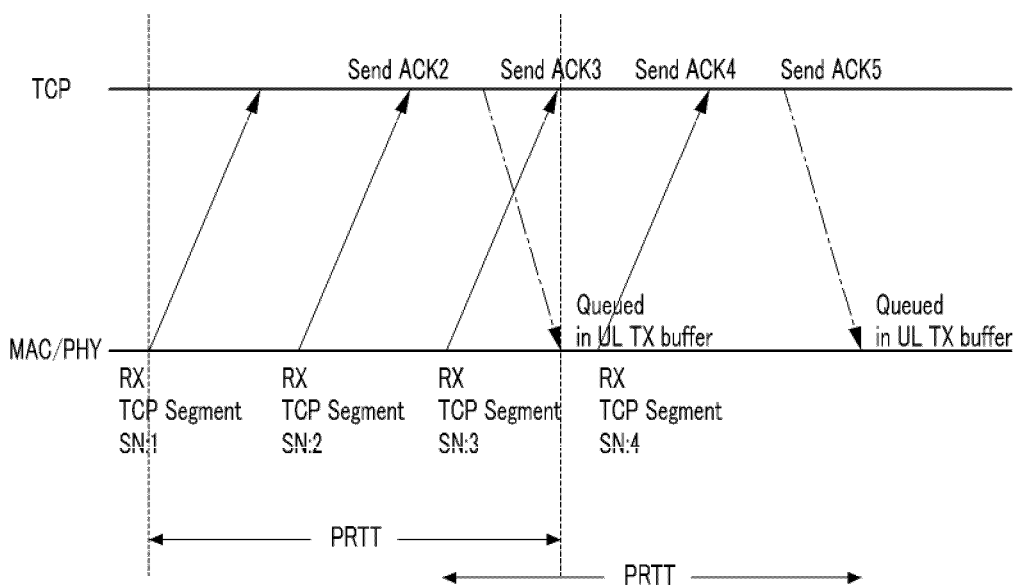

FIG. 2A illustrates an example of measurement of a partial round trip time (PRTT) in a general scheme, and FIG. 2B illustrates an example of measurement of a partial round trip time (PRTT) in a delayed acknowledgment scheme.

Referring to FIG. 2A, the mobile station 100 transmits, from a point of receiving a downlink TCP segment (SN:1) at an MAC/PHY hierarchy from the base station 200 through a wireless communication network, the corresponding downlink TCP segment (SN:1) to a TCP hierarchy, and measures a time until TCP ACK (Send ACK 2) corresponding to a response of the segment is inputted into a uplink transmission MAC buffer.

Referring to FIG. 2B, in accordance with information previously set by the delayed acknowledgment scheme, the mobile station 100 transmits, from the point of receiving the downlink TCP segment (SN:1) at the MAC/PHY hierarchy from the base station 200 through the wireless communication network, the corresponding downlink TCP segment (SN:1) to the TCP hierarchy, and measures a time until TCP ACK (Send ACK 3) corresponding to a response of the segment is inputted into the uplink transmission MAC buffer.

The calculation unit 132 calculates an average and a standard deviation of the partial round trip time (PRTT), which are measured when the partial round trip time (PRTT) is repeated at a predetermined number of times ($N_{measurement}$) in the measurement unit 131.

The message generation unit 133 generates a "PRTT report message" including a service connection ID, and the average and standard deviation of the measured partial round trip time (PRTT).

The unicast operator 140 includes a determination unit 141. When the unicast operator 140 receives information on "receiving a request for transmission of the TCP ACK from an upper hierarchy" from the TCP ACK generator 120, the unicast operator 140 starts driving a unicast chance waiting timer ($T_{waiting}$) and waits for a unicast uplink access chance.

The determination unit 141 determines whether or not the uplink access chance is allocated until the unicast chance waiting timer ($T_{waiting}$) is terminated.

When the uplink access chance is acquired before the unicast chance waiting timer ($T_{waiting}$) is terminated, the TCP ACK is transmitted by using the allocated resource. On the contrary, when the uplink access chance is not acquired until the unicast chance waiting timer ($T_{waiting}$) is terminated, uplink data transmission can be tried by using wireless section random access like a known best-effort service scheme.

The controller 150 controls operations of the transceiver 110, the TCP ACK generator 120, the report processor 130, and the unicast operator 140.

The base station (BS) 200 includes a transceiver 210, a calculator 220, a message generator 230, a resource allocator 240, and a controller 250. The base station 200 calculates a reception point of the TCP ACK on the basis of the "PRTT report message" received from the mobile station 100, and transmits information on the reception point of the TCP ACK to the mobile station 100. The components of the base station 200 will be described below.

The transceiver 210 receives the "PRTT report message" from the mobile station 100, and transmits the "resource allocation information message" generated in the message generator 230 to the mobile station 100.

The calculator 220 calculates an occurrence point of uplink traffic on the basis of the "PRTT report message" received from the mobile station 100. That is, the calculator 220 calculates the occurrence point of the uplink traffic from the mobile station 100 to the base station 200 after downlink TCP traffic is serviced from the base station 200 to the mobile station 100.

More specifically, the calculator 220 calculates a reception point of the TCP ACK with respect to a TCP segment to be transmitted and the reception point of the TCP ACK can be calculated as shown in Equation 1.

Uplink access estimation frame number=Current frame number+$N_{offset}$ $$N_{offset} = \text{Average value of PRTT} + (\alpha \times \text{Standard deviation value of PRTT}) \quad \text{[Equation 1]}$$

The message generator 230 generates the "resource allocation information message". At this time, the "resource allocation information message", as information on unicast resource allocation for transmitting the ACK from the mobile station to the base station in the future, includes information on the "service connection ID" and the "unicast chance waiting timer ($T_{waiting}$)" waiting for the unicast uplink access chance after the mobile station 100 receives the request for transmitting the TCP ACK from the upper hierarchy.

The resource allocator 240 allocates a unicast uplink resource (i.e., bandwidth) to the mobile station 100 at the occurrence point of the uplink traffic calculated in the calculator 220.

The controller 250 controls operations of the transceiver 210, the calculator 220, the message generator 230, and the resource allocator 240.

An access router 300 performs mobility control and a packet router function of the mobile station 100.

Hereinafter, a method for an uplink service according to an exemplary embodiment of the present invention will be described in detail with reference to the accompanying drawings.

FIG. 3 is a flowchart of a method for an uplink service according to an exemplary embodiment of the present invention.

Referring to FIG. 3, when a TCP packet (PDU with TCP segment) is successively transmitted from a base station 200 to a mobile station 100 (FN:0), the mobile station 100 generates TCP ACK of the received TCP packet (FN:1) and measures a "partial round trip time (PRTT)" (FN:2).

Thereafter, the mobile station 100 tries wireless section random access to the base station 200 in order to transmit the TCP ACK (FN:3). Thereafter, CDMA allocation IE data are transmitted to the mobile station 100 through an uplink map (UL-MAP) message in the base station 200 (FN:4), and the mobile station 100 transmits a bandwidth request allocation header (BR-Req. Header) to the base station 200 (FN:5).

Thereafter, the base station 200 that receives the bandwidth request allocation header (BR-Req. Header) allocates the resource by transmitting unicast burst allocation to the mobile station 100 through the uplink map (UL-MAP) message (FN:6) and the mobile station 100 transmits the previously generated TCP ACK to the base station, such that transmission of the TCP packet is terminated (FN:7).

When steps of FN:0 to FN:7 are repeated at a predetermined number of times (Nmeasurement), the mobile station 100 calculates an average and a standard deviation of the measured partial round trip time (PRTT) (FN:8).

Thereafter, the mobile station 100 generates a PRTT report message including a service connection ID, and the average and standard deviation of the measured partial round trip time (PRTT) (FN:9) and transmits the generated PRTT report message to the base station 200 (FN:10).

At this time, the PRTT report message may be transmitted after steps of FN:0 to FN:7 are repeated the predetermined number of times (Nmeasurement), or the PRTT report message may be eventually transmitted when a request is received from the base station 200 or by a report necessity in accordance with a statistical change of the partial round trip time (PRTT).

The base station 200 that receives the PRTT report message calculates a reception point of the TCP ACK with respect to the TCP segment to be transmitted (FN:11), and transmits a "resource allocation information message" including information on a "unicast chance waiting timer (Twaiting)" waiting a unicast uplink access chance to the mobile station 100 after the mobile station 100 receives a request for transmitting the TCP ACK from an upper hierarchy (FN:12).

Thereafter, when the TCP packet (PDU with TCP segment) is successively transmitted from the base station 200 to the mobile station 100 (FN:13) and the mobile station 100 receives the request for transmitting the TCP ACK from the upper hierarchy (FN:14), the mobile station 100 starts driving the unicast chance waiting timer (Twaiting) and waits for the unicast uplink access chance (FN:15). At this time, a time-out time of the unicast chance waiting timer (Twaiting) does not exceed 500 ms which is an ACK transmission limit time in the TCP.

When an uplink access estimation frame is reached, the base station 200 allocates the unicast uplink access chance to the mobile station 100 (FN:16). The size of the allocation resource is determined by negotiation at the time of establishing service connection so as to transmit the TCP ACK. When a wireless resource is not sufficient for the TCP ACK in the estimation frame, the base station 200 can allocate the uplink resource for a BW-REQ header or allocate resource for the TCP ACK in the next frames.

The mobile station 100 that acquires the uplink access chance transmits relevant TCP ACK (FN:17).

Meanwhile, the mobile station 100 that does not acquire the uplink access chance until the unicast chance waiting timer (Twaiting) is terminated may attempt transmitting the uplink data by using the known wireless section random access.

Figure 4:
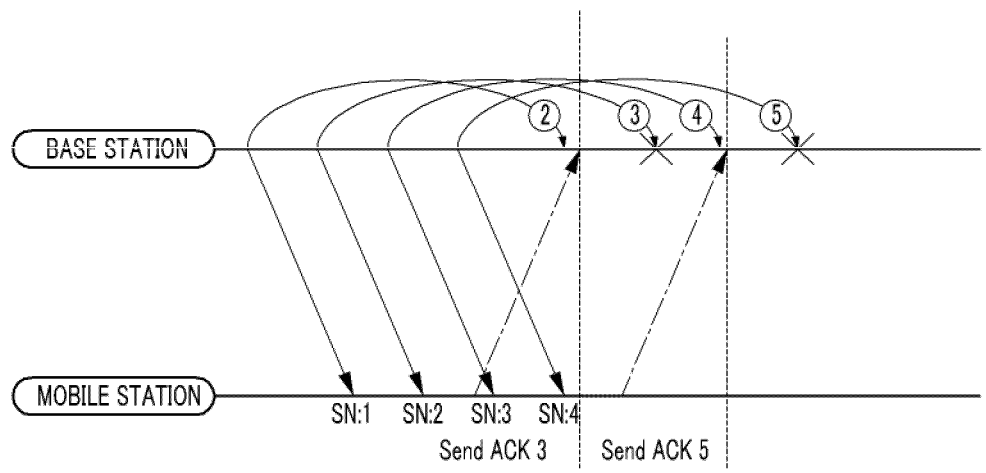
FIG. 4 is a diagram for illustrating resource allocation for delayed acknowledgments scheme TCP ACK of a delayed acknowledgments scheme in a base station 200 according to an exemplary embodiment of the present invention.

FIG. 4 is a diagram for illustrating resource allocation for delayed acknowledgments scheme TCP ACK in a base station 200 according to an exemplary embodiment of the present invention.

Referring to FIG. 4, after the base station 200 transmits segments of serial numbers 1 to 4, the base station 200 allocates corresponding wireless resources for ACK corresponding to the segments, respectively, after the Noffset frame of Equation 1. At this time, ⓚ is the number of TCP ACK that is estimated to be received.

However, the base station 200 grants a unicast chance to the mobile station 100 (the number of the TCP ACK that is estimated to be received is 2 (resource allocation of ②)). In this case, when the number of the TCP ACK received from the mobile station 100 is 3, the base station 200 determines the delayed acknowledgments scheme and cancels up to the unicast resource allocation in which the reception estimation number of the TCP ACK to be allocated is 3 (resource allocation of ③ is cancelled).

That is, the base station 200 cancels allocation of a future unicast uplink access chance for TCP ACK having a serial number (SN) which is equal to or smaller than the ACK number received from the mobile station 100. Therefore, it is possible to avoid unnecessary waste of the wireless resource at the time of the TCP operation using the delayed acknowledgments scheme.

Parameters negotiated at the time of establishing uplink service connection in order to excellently perform the operation according to an exemplary embodiment of the present invention may include i) the service connection ID of relevant downlink, ii) the size of a service data unit at the time of allocating the unicast resource, iii) the unicast chance waiting timer value ($T_{waiting}$), and iv) the number of times ($N_{measurement}$) to try measuring the partial round trip time.

A base station according to the present invention calculates an occurrence point of uplink traffic from a mobile station after transmitting downlink TCP traffic data to the mobile station and appropriately allocates a unicast uplink resource for the mobile station to a calculated time section, such that the mobile station can instantly transmit uplink traffic without using wireless section random access.

Accordingly, according to the present invention, it is possible to solve a problem in that a round trip time increases at the time of transmitting and receiving packet data between the base station and the mobile station due to a wireless access characteristic of a best-effort service and provide a speed enhancement effect while backward scheduling in the base station.

The exemplary embodiments of the present invention are not only implemented through the apparatus and method, but may be implemented through a program that realizes functions corresponding to constituent members of the exemplary embodiments of the present invention or a recording medium in which the program is recorded. The implementation will be easily implemented by those skilled in the art as described in the exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for providing an uplink service in a mobile station, comprising:
   (a) measuring a partial round trip time, wherein the partial round trip time is a time until ACK which is a response to the received TCP data is inputted into an uplink transmission MAC buffer after TCP data are received from a base station;
   (b) transmitting information on the measured partial round trip time to the base station;
   (c) receiving resource allocation information—unicast resource allocation information for transmitting the ACK to the base station in the mobile station—from the base station; and
   (d) transmitting the ACK of the TCP data received from the base station on the basis of the resource allocation information to the base station,
   wherein the resource allocation information includes information on a unicast chance waiting timer which is a time when the mobile station waits for a unicast uplink access chance allocated from the base station after receiving a request for transmitting the ACK from an upper hierarchy.

2. The method of claim 1, wherein the step (d) includes:
   (i) starting driving the unicast chance waiting timer when the ACK of the TCP data received from the base station is inputted into an uplink transmission MAC buffer, and
   (ii) transmitting the ACK using unicast uplink resource allocated from the base station when the unicast uplink resource is allocated from the base station before the unicast chance waiting timer is terminated.

3. The method of claim 2, wherein the step (d) further includes (iii) transmitting the ACK to the base station in a wireless section random access scheme when the unicast uplink resource is not allocated from the base station until the unicast chance waiting timer is terminated.

4. The method of claim 3, wherein the partial round trip time is measured by analyzing a serial number of the TCP data received from the base station and an ACK number that is requested to be transmitted to the uplink transmission MAC buffer.

5. The method of claim 4, wherein the information on the partial round trip time of step (b) includes information on an average and a standard deviation of the partial round trip time, which are measured by performing the step (a) multiple times.

6. The method of claim 5, wherein the step (c) is performed after the step (a) is repeated a predetermined number of times when a request is received from the base station, or when a report is required due to modification of the information on the partial round trip time.

7. A method for providing an uplink service to a mobile station in a base station, comprising:
   (a) receiving information on a partial round trip time from the mobile station, wherein the partial round trip time is a time until ACK which is a response to TCP data is inputted into an uplink transmission MAC buffer after the mobile station receives the TCP data from the base station;
   (b) calculating a reception point of ACK of the TCP data to be transmitted in the future on the basis of information on the partial round trip time and transmitting resource allocation information—unicast resource allocation information for transmitting the ACK to the base station in the mobile station—to the mobile station; and
   (c) allocating a unicast uplink resource to the mobile station at the reception point of the ACK after transmitting the TCP data to the mobile station,
   wherein the resource allocation information includes information on a unicast chance waiting timer which is a time of waiting for a unicast uplink access chance allocated from the base station after the mobile station receives a request for transmitting the ACK from an upper hierarchy.

8. The method of claim 7, wherein the information on the partial round trip time in the step (a) includes information on an average and a standard deviation of the partial round trip time.

9. The method of claim 7, wherein the step (b) includes:
   (i) calculating a reception point of ACK of TCP data to be transmitted in the future on the basis of the information on the average and standard deviation of the partial round trip time, and
   (ii) transmitting the resource allocation information to the mobile station.

10. The method of claim 9, further comprising (d) cancelling unicast uplink resource allocation for receiving a TCP ACK having a number which is equal to or less than a number of a TCP ACK received from the mobile station when the number of the TCP ACK received from the mobile station is larger than an estimated TCP ACK number.

* * * * *